Figure 1:
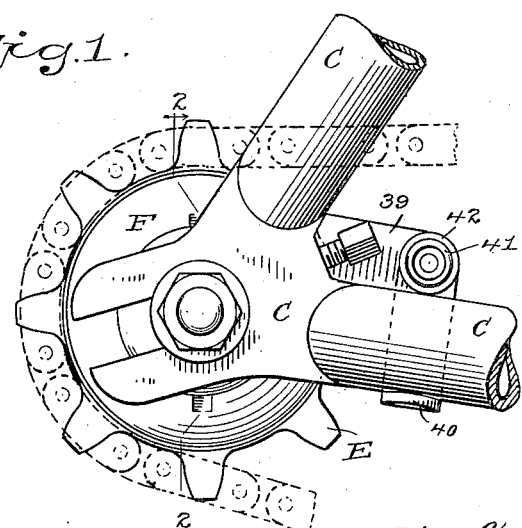

No. 678,572. Patented July 16, 1901.
E. F. KELLEY.
REAR HUB COASTER AND BRAKE.
(Application filed Oct. 5, 1900.)
(No Model.)

Fig. 5ª

WITNESSES.
H. J. Lamb.
S. H. Atherton.

INVENTOR.
Edward F. Kelley
By A. M. Wooster
Atty.

THE NORRIS PETERS CO., PHOTO-LITHO., WASHINGTON, D. C.

UNITED STATES PATENT OFFICE.

EDWARD F. KELLEY, OF SOUTH NORWALK, CONNECTICUT.

REAR-HUB COASTER AND BRAKE.

SPECIFICATION forming part of Letters Patent No. 678,572, dated July 16, 1901.

Application filed October 5, 1900. Serial No. 32,159. (No model.)

*To all whom it may concern:*

Be it known that I, EDWARD F. KELLEY, a citizen of the United States, residing at South Norwalk, county of Fairfield, State of Connecticut, have invented a new and useful Rear-Hub Coaster and Brake, of which the following is a specification.

My invention has for its object to provide a rear-hub coaster and brake which shall contain less parts than other devices of the character now upon the market, shall be lighter, smaller, cheaper, and stronger, shall be perfectly sure in operation and practically impossible to get out of order, so thin that no springing of the frame is necessary in putting it upon ordinary bicycles, and which will permit the bicycle to be moved backward as well as forward, the rear hub turning backward freely and without braking when so desired and the device as a whole being but two inches in diameter and relatively thin, thereby avoiding the heavy and clumsy appearance of most of the coaster-brakes now upon the market. In order to accomplish these results, I have devised the simple and novel structure which I will now describe, referring to the accompanying drawings, forming part of this specification, and using reference characters to designate the several parts.

Figure 2:
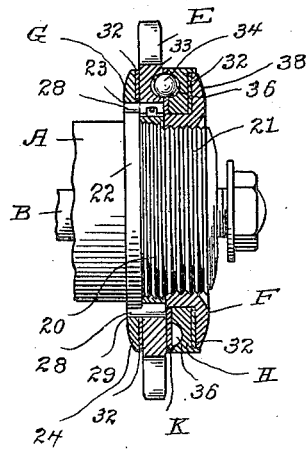
Figure 3:
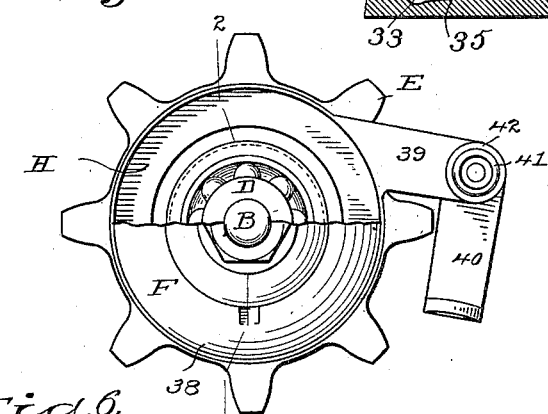
Figure 4:
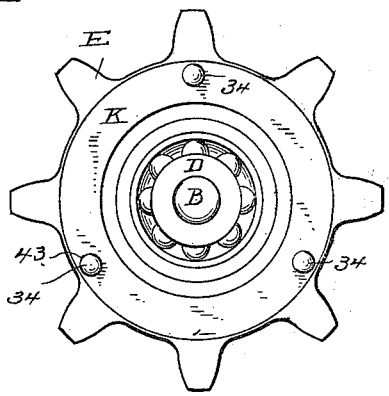
Figure 6:
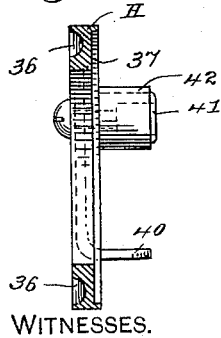
Figure 5:
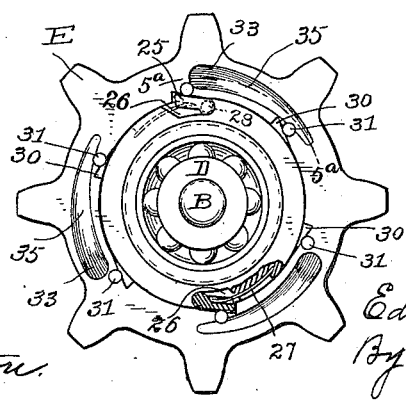
Figure 7:
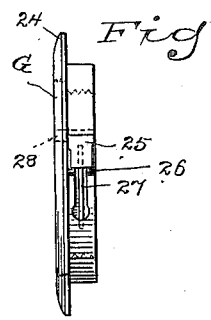

Figure 1 is a side elevation showing the rear hub of a bicycle with my novel coaster-brake applied thereto in position in the frame; Fig. 2, a section of the coaster and brake mechanism on the line 2 2 in Figs. 1 and 3, the hub being in elevation; Fig. 3, an elevation corresponding with Fig. 1, the frame being removed and the upper portion of the outer ring broken away; Fig. 4, a similar view, the outer and the intermediate rings being removed, showing the equalizing-ring and the balls in elevation; Fig. 5, a similar view with the equalizing-ring and the balls removed, the driven wheel being in elevation. Fig. 5$^a$ is a detail section on line 5$^a$ 5$^a$ of Fig. 5 with the addition of the ball spacing or equalizing ring, shown also in section; Fig. 6, a vertical section of the intermediate ring detached, and Fig. 7 is an edge view of the inner ring detached.

A denotes a rear hub; B, the axle; C, the frame; D, one of the rear-hub bearings, and E a driven wheel, which is illustrated as a sprocket-wheel. These parts may all be of any ordinary or preferred construction, the general style of the bicycle being unimportant so far as the principle of my invention is concerned.

The essential elements of my novel structure are an outer ring F, an inner ring G, an intermediate ring H, and an equalizing-ring K. The hub is provided with a right-hand screw-thread 20 and a left-hand screw-thread 21 and in the present instance is shown as provided with a flange 22. The inner ring G is threaded to engage right-hand screw-thread 20 on the hub and is shown as provided with a recess 23, which receives flange 22. Inner ring G is also provided with a flange 24, the purpose of which will presently be fully explained.

25 denotes pawls, which lie in recesses 26 in the periphery of the inner ring and are normally thrown outward by springs 27. In the present instance I have shown the pawls as provided with lugs 28, which lie in holes 29 in flange 24, this connection of the pawls with the flange being adapted in the special form of bicycle illustrated to render displacement or binding of the pawls impossible. The driven wheel E lies next at the side of the inner ring and is provided on its inner periphery with recesses 30, each having an abrupt face and an incline, the abrupt faces of two of these inclines being engaged by the pawls upon the inner ring, whereby the inner sleeve, hub, &c., are carried when power is applied to the driven wheel, said pawls riding backward up the inclines and the inner sleeve, hub, &c., turning freely within the driven wheel when the bicycle is coasting. In order to prevent noise being made by the pawls as they drop into the recesses when the bicycle is coasting, I provide plugs of leather or other suitable material, which I have indicated by 31, and which lie in suitable recesses in the driven wheel. The engagement of the pawls with these plugs makes no sound whatever, so that the bicycle is perfectly noiseless in coasting. Between the driven wheel and flange 22 on the inner ring I interpose a friction-ring 32, which may be made of hard fiber or other suitable material.

33 denotes sockets in the outer face of the driven wheel, which are adapted to partially receive balls 34, and 35 denotes curved inclined grooves, one end of each groove running into one of the sockets and the other end running out on the face of the wheel, the sockets, however, being slightly deeper than the deepest portions of the grooves, so that the balls will remain therein when it is desired to run the wheel backward, as will be more fully explained. Fig. 5ª illustrates one of the sockets at the end of an inclined groove 35, the bottom of this socket being slightly below the plane of the bottom of the inclined groove.

The intermediate ring H is provided in its inner face with a groove or ball-race 36, that is practically semicircular in cross-section, and in its outer face with a recess 37, which is adapted to receive a flange 38 on outer ring F and also a friction-ring 32, which is interposed between flange 38 and the intermediate ring. Outer ring G, it should be noted, engages the left-hand screw-thread 21 on the hub, so that it will be impossible for the ring to be turned off from the hub by any of the conditions of use. The intermediate ring is in use held stationary in any convenient manner. In the present instance I have shown said ring as provided with an arm which extends forward and has pivoted at its end an L-shaped clamp 40, which is adapted to engage one side of the lower rear fork of the bicycle-frame. In order to prevent rattling, I have shown the arm as provided with a hub 41, carrying a rubber or other suitable pad 42, which engages the rear fork of the frame and holds the latter firmly gripped between itself and the L-shaped clamp. Between the intermediate ring and the driven wheel lies the equalizing-ring K, which is provided with holes 43, corresponding with the number of balls, sockets, and inclines—in the present instance three. These holes are just large enough to permit the balls to pass through freely, the balls lying normally in the holes and partly in the sockets in the driven wheel and partly in the ball-race in the intermediate ring. The action of the equalizing-ring is to insure that all of the balls act in unison and to do away with any possibility of wedging or binding. By the use of the equalizing-ring it is assured that all of the balls drop into the sockets together or travel up the inclines together, as may be required by the conditions of use.

The operation is as follows: I have termed the wheel by which the rear hub is driven as a "driven" wheel, for the reason that in considering a bicycle as a whole it is a driven wheel and receives power through some intermediate devices from a driving-wheel. So far as the present structure is concerned, however, the wheel I have termed the "driven" wheel is a driving-wheel in that it drives the rear hub. In driving the bicycle forward the pawls upon inner ring G being forced outward by the springs engage the abrupt faces of recesses 30 in the inner periphery of wheel E, so that as said wheel is driven forward by the pedaling of the rider the rear hub will be carried thereby, and consequently the bicycle will move forward. As soon, however, as the hub commences to move faster than wheel E, either through the rider's stopping pedaling or the bicycle acquiring momentum on a downgrade, the abrupt faces of recesses 30 instead of driving the hub through engagement with the pawls will fail to keep up with the pawls and the latter will drop into and pass out of the recesses, owing to the more rapid rotation of the hub, no noise being made by the pawls, however, for the reason that as they drop into the recesses they strike plugs 31 instead of upon the metal of wheel E. The bicycle is now coasting, the balls lying partly in sockets 33 in wheel E and partly in the ball-race in intermediate ring H, the intermediate ring being stationary, as already described, the hub, inner and outer rings, &c., rotating freely and wheel E remaining stationary. Should it be required to brake the bicycle the rider back-pedals, the effect of which is to turn wheel E backward slightly—that is, in the opposite direction from which the hub and the inner and outer rings are turning. The effect of this reverse movement of wheel E is to cause the balls to ride up the inclined grooves 35, equalizing-ring K causing them all to move together. As the balls ride up the inclines the effect necessarily is to force the intermediate ring and wheel E violently outward away from each other and against the friction-rings 32, which are interposed, respectively, between wheel E and flange 24 on the inner ring and between the intermediate ring and flange 38 on the outer ring, thus producing an instantaneous and double brake action, either of which, owing to the relatively large braking surface, is equal to the ordinary braking action in devices of this character. It will be obvious that the braking action produced through lateral pressure of the non-rotating intermediate ring against the friction-ring lying between itself and the rotating flange on the outer ring is fully equaled by the braking action produced through the lateral pressure of wheel E, which after the braking movement becomes stationary, and the flange upon the inner ring, which is moving in the opposite direction.

In practice the sockets 33 in the face of wheel E while not made deep enough to interfere to any perceptible extent with the riding of the balls up the inclines when wheel E is moved backward are yet deep enough so that they will usually retain the balls and permit a rider when handling a bicycle under ordinary conditions to move it backward freely. In practice the said sockets 33 are formed somewhat as indicated by the shading in Fig. 5 and as indicated by the sectional view, Fig. 5ª, although they may not be quite as deep as indicated in said Fig. 5ª.

Having thus described my invention, I claim—

1. A device of the character described comprising a hub, flanged inner and outer rings carried thereby, pawls carried by said inner ring and having lugs lying in holes in the flange of the inner ring to prevent relative displacement of the pawls, and a driven wheel and a non-rotating intermediate ring lying between the flanges, said driven wheel being mounted rotatably on the inner ring and having recesses with abrupt faces and inclines engaged by the pawls and in its outer face inclined grooves, and said intermediate ring having in its inner face a ball-race, and balls in said ball-race and grooves, the pawls acting to drive the hub when the driven wheel turns forward and the balls riding up the inclines when the driven wheel is moved backward and forcing the intermediate ring and the driven wheel laterally against the flanges upon the inner and outer rings and stopping the rotation of the hub.

2. A device of the character described comprising a hub, flanged inner and outer rings carried thereby, pawls carried by said inner ring and having lugs lying in holes in the flange of the inner ring to prevent relative displacement of the pawls, and a driven wheel and a non-rotating intermediate ring lying between the flanges, said driven wheel being mounted rotatably on the inner ring and having recesses with abrupt faces and inclines engaged by the pawls and in its outer face sockets and inclined grooves and said intermediate ring having in its inner face a ball-race, and balls between said ring and the driven wheel, the pawls acting to drive the hub when the driven wheel turns forward, the balls remaining in the sockets and likewise when the bicycle is moved backward and is coasting and said balls riding up the inclines when the driven wheel is moved backward relatively to the hub whereby the intermediate ring and the driven wheel are forced laterally against the flanges and the rotation of the hub is stopped.

3. A rear-hub coaster and brake comprising a hub, flanged inner and outer rings carried thereby, pawls carried by said inner ring and having lugs lying in holes in the flange of the inner ring to prevent relative displacement of the pawls, a driven wheel and a non-rotating intermediate ring lying between the flanges, said driven wheel being mounted rotatably on the inner ring and having recesses with abrupt faces and inclines engaged by the pawls, and in its outer face sockets and inclined grooves and said intermediate ring having in its face a ball-race, balls between said intermediate ring and the driven wheel and an equalizing-ring lying between said ring and wheel and having holes which receive the balls, said equalizing-ring acting to cause the balls to drop into the sockets and to ride up the inclines in unison, the pawls acting to drive the hub normally and moving backward over the inclines in coasting.

4. A rear-hub coaster and brake comprising a hub, flanged inner and outer rings carried thereby, pawls carried by said inner ring and having lugs lying in holes in the flange of the inner ring to prevent relative displacement of the pawls, and a driven wheel and a non-rotatable intermediate ring lying between the flanges, said driven wheel being mounted rotatably on the inner ring and having recesses with abrupt faces and inclines engaged by the pawls, said inclines being provided with soft plugs to receive the pawls, and in its outer face having inclined grooves, and said intermediate ring having in its face a ball-race, and balls between said intermediate ring and driven wheel, substantially as described, for the purpose specified.

5. A rear-hub coaster and brake comprising a hub, flanged inner and outer rings carried thereby, a driven wheel and a non-rotating intermediate ring lying between the flanges, said driven wheel being mounted rotatably on the inner ring and said parts having a pawl-and-recess connection, the driven wheel having in its outer face inclined grooves formed with sockets at the deeper ends thereof, each of said sockets having its bottom slightly below the plane of the bottom of the inclined groove and the intermediate ring having in its inner face a ball-race, balls between said ring and wheel and friction-rings lying between the driven wheel and intermediate ring and the flanges respectively, whereby rotation of the hub is stopped when the driven wheel and intermediate ring are moved away from each other by movement of the balls up the inclines.

6. In a rear-hub coaster and brake the combination with rotatable inner and outer rings, of a driven wheel mounted to turn on one of said rings and having a suitable connection therewith and in its inner face inclined grooves formed with sockets at the deeper ends thereof, each of said sockets having its bottom slightly below the plane of the bottom of the inclined groove, a non-rotating intermediate ring having in its inner face a ball-race and balls between said driven wheel and intermediate ring, whereby rotation of the rings is stopped when backward movement of the driven wheel causes the balls to ride up the inclines and force the driven wheel and intermediate ring against the inner and outer rings respectively.

7. In a rear-hub coaster and brake the combination with rotatable inner and outer rings, of a driven wheel mounted to turn on one of said rings and having a suitable connection therewith and in its inner face inclined grooves formed with sockets at the deeper ends thereof, each of said sockets having its bottom slightly below the plane of the bottom of the inclined groove, a non-rotating intermediate ring having in its inner face a ball-race, balls between said driven wheel and intermediate ring and an equalizing-ring also lying between said parts and having holes which receive the balls, substantially as shown, for the purpose specified.

8. In a rear-hub coaster and brake, the combination with rotatable inner and outer rings, of a driven wheel mounted to turn on one of said rings and having a suitable connection therewith and in its inner face sockets and inclined grooves the grooves leading to said sockets, each of said sockets having in its bottom slightly below the plane of the bottom of the inclined groove, a non-rotating intermediate ring having in its inner face a ball-race, balls between said driven wheel and intermediate ring and friction-rings between the driven wheel and intermediate ring and the inner and outer rings respectively.

In testimony whereof I affix my signature in presence of two witnesses.

EDWARD F. KELLEY.

Witnesses:
  A. M. WOOSTER,
  S. W. ATHERTON.